United States Patent [19]

Parry

[11] Patent Number: 5,574,920
[45] Date of Patent: Nov. 12, 1996

[54] METHOD FOR CONTROLLING POWER DOWN OF A HARD DISK DRIVE IN A COMPUTER

[75] Inventor: William G. Parry, Bellevue, Wash.

[73] Assignee: Microsoft Corporation, Redmond, Wash.

[21] Appl. No.: 328,366

[22] Filed: Oct. 25, 1994

[51] Int. Cl.$^6$ .................................................. G06F 13/00
[52] U.S. Cl. .............................. 395/750; 395/561; 360/69
[58] Field of Search ........................................... 395/775, 750, 395/700; 360/69

[56] References Cited

U.S. PATENT DOCUMENTS

| | | | |
|---|---|---|---|
| 4,695,945 | 9/1987 | Irwin | 364/200 |
| 5,297,282 | 3/1994 | Meilak et al. | 395/700 |
| 5,337,195 | 8/1994 | Ito et al. | 360/27 |
| 5,369,771 | 11/1994 | Gettel | 395/750 |
| 5,402,200 | 3/1995 | Shrinkle et al. | 360/69 |

*Primary Examiner*—Jack B. Harvey
*Assistant Examiner*—John Travis
*Attorney, Agent, or Firm*—Jones & Askew

[57] ABSTRACT

An integrated device electronics (IDE) driver 40 operating in conjunction with a Basic Input/Output System (BIOS) driver (14), wherein both the IDE driver (40) and BIOS driver (14) are capable of powering down a hard disk drive (18). The IDE driver (40) monitors accesses to an alternate status register (32) by the BIOS driver (14). Upon detecting an access to the alternative status register (32), the IDE driver (40) commences writing any uncommitted data to the hard disk drive (18). The IDE driver (40) inhibits power down by the BIOS driver (14) until it finishes committing any uncommitted data to the hard disk drive (18). After all uncommitted data is committed to the hard disk drive (18), the BIOS driver (14) is permitted to power down the hard disk drive (18). A timer is set to reactivate the IDE driver (40). If the hard disk drive (18) was put to sleep, a reset from the BIOS driver (14) must occur before the IDE driver (40) can access the hard disk drive (18). If the hard disk drive (18) was placed in standby mode, the IDE driver (40) can reactivate and access the hard disk drive (18). In either case, the IDE driver (40) queues request for access to the hard disk drive (18) until such request can be performed after the hard disk drive (18) is powered-up.

25 Claims, 3 Drawing Sheets

METHOD FOR CONTROLLING POWER DOWN OF A HARD DISK DRIVE IN A COMPUTER

TECHNICAL FIELD

The present invention is an improved method and apparatus for controlling power management operations in a computer, and more specifically is an improved method for arbitrating between a first driver and a second, improved driver wherein both drivers have the capability of separately powering down a hard disk drive.

BACKGROUND OF THE INVENTION

Most computers in use today include a hard disk drive. A hard disk drive is typically a device including a magnetic head, a motor, and one or more platters that store information. The motor turns a platter underneath the magnetic head. The platter contains electrically encoded data that is detected by the magnetic head as the head passes over the platter. The platter can be read from or written to and is generally used to store data that will be accessed by the computer. The hard disk drive is typically referred to as random access memory and is familiar to those skilled in the art.

Typically, data is arranged in concentric circles on the platter. The magnetic head is moved along a radius of the platter, and the magnetic head reader/writer accesses particular locations within the platter as the platter spins under the magnetic head. Those skilled in the art are familiar with the read and write operations of hard disk drives.

Unfortunately, constantly spinning the platter in the hard disk drive consumes a large amount of power. Specifically, a motor must be devoted to spinning the platter to allow access to the full physical array of data on the platter. Powering a mechanical device, such as a motor, consumes a significant amount of power relative to the power consumed by the electronic circuitry within a computer.

The consumption of power is a major concern in many computers. Specifically, power consumption is a major factor in the design and construction of portable computers. Many in the industry anticipate that over fifty-percent (50%) of computers sold within 10 years will be portable. The concern over power consumption relating to portable computers arises due to their reliance upon batteries with a short life.

One power management technique commonly used in portable computers is turning off the hard disk drive motor when the hard disk drive has not been used recently. There are several methods of turning off the hard disk drive motor while leaving the remainder of the computer circuitry on. Many computers include a "sleep" button that the user may depress to power down the hard disk drive motor without powering down the entire computer. Thus, if a user needs to sit and think or perform tasks that do not require access to the hard disk drive, the user can depress the sleep button. Depressing the sleep button powers down the hard disk drive, meaning that the motor stops spinning the platter, but the user will not have to reboot the entire computer to initiate operations again. The Basic Input/Output system driver (BIOS driver) commonly found in personal computers receives the signal from the "sleep" key and controls power down of the hard disk drive. This allows the user to conserve battery power that would otherwise be wasted powering the motor in the hard disk drive when the hard disk drive is not being accessed.

Other methods of powering down the hard disk drive have also been developed. Those skilled in the art are familiar with computers that include a timed power down of a hard disk drive that is controlled by the BIOS driver. The BIOS driver can be programmed to power down the hard disk drive after the passage of a predetermined time period during which the hard disk drive has not been accessed. For example, the BIOS driver can be set to power down the hard disk drive automatically if the hard disk drive is not accessed for five minutes. If the user leaves the computer for longer than the predetermined period of time, the hard disk drive will automatically be powered down to conserve power.

Thus, there are at least two different methods for powering down the hard disk drive via the BIOS driver. As computer technology has evolved, however, control over the hard disk drive has become more diluted. Specifically, in operating systems marketed under the "WINDOWS" trademark by Microsoft Corporation, the assignee of the present invention, a driver other than the BIOS driver may also control a hard disk drive. Those skilled in the art are familiar with the operating system sold under the "WINDOWS" trademark and operating systems compatible therewith. A driver in such operating systems is typically called an Integrated Device Electronics driver (IDE driver). The IDE driver serves as the interface between such operating systems and the hard disk drive.

Thus, there are two separate drivers that have access to and can control a single hard disk drive in a computer. The BIOS driver is the first driver that will interact with and control the hard disk drive. The IDE driver is the second driver that will access and control the hard disk drive.

Unfortunately, the BIOS driver was written well before the creation of IDE drivers. Thus, the BIOS driver assumes that it is in sole control of the hard disk drive. The BIOS driver therefore may take action to control the hard disk drive without knowing that another driver, the IDE driver, is also accessing the hard disk drive.

An example of a conflict from the above-referenced situation is when the BIOS driver attempts to power down the hard disk drive. The BIOS driver will power down the hard disk drive without regard for pending or future activities of the IDE driver relating to the hard disk drive. More specifically, the user running an application program in conjunction with the operating system might want to store data to the hard disk drive through the IDE driver. The user would depress a save button to indicate that the data should be saved to the hard disk drive. "Lazy writing" will be used to store the data on the hard disk drive. Lazy writing is the process of sending data to the IDE driver wherein the data is stored in a file system manager buffer. After accepting the data in the file system manager buffer, the IDE driver signals the application program that the data has been written to the hard disk drive, even though the data has actually not been written to the hard disk drive. After a period of time, typically one to two seconds, the IDE driver will commit the data from the buffers in the file system manager to the hard disk drive. Lazy writing produces zero access time for write operations from the perspective of the application program, thereby increasing the speed of the computer from the perspective of the user of the computer.

Consider, however, what happens when the user saves data, and then immediately depresses the sleep button on the computer. Depressing the sleep button on the computer causes the BIOS driver to immediately begin to power down the hard disk drive. Thus, the hard disk drive will be powered down before or during write operations by the IDE driver, and before the data can be committed from the buffer in the file system manager to the hard disk drive. Typically, the IDE driver will attempt to commit the data to the hard disk drive during or after power down, resulting in at least a failure to put the data on the hard disk drive. More frequently, attempting to write to a down hard disk drive that is being powered down causes the entire computer to crash.

Other problems related to the above-referenced situation occur even more frequently. As set forth above, the BIOS driver can be programmed to power down the hard disk drive. The BIOS driver will not recognize activity by the IDE driver in accessing the hard disk drive. For example, the IDE driver could be actively and regularly transferring data to and from the hard disk drive. However, the BIOS driver will not detect such activity. Thus, the BIOS driver may time out due to a perceived lack of activity at the hard disk drive during the middle of, or right before, the IDE driver's accessing of the hard disk drive.

The above-referenced conflict is quite severe, as is recognized by those skilled in the art. Indeed, IDE drivers are generally not used in computers today despite the fact that they improve access times to the hard disk drive by fifty to sixty-five percent (50–65%) over the traditional BIOS driver. The high speed of the IDE drivers is thus wasted to avoid crashing the computer due to the BIOS driver powering down the hard disk drive while the IDE driver is operational.

Further complicating the situation is the fact that there is not a distinction between a laptop and desktop computer as far as the power management scheme in the computer is concerned. In other words, an IDE driver loaded on a desktop computer that is not subject to severe limitations on power consumption still is not used because the operating system can not tell whether the computer is a laptop or desktop unit. Despite the fact that the hard disk drive of a desktop computer will likely not be powered down because power conservation is not a concern, the IDE driver will not be used because of concern that the BIOS driver will power down the hard disk drive. The conflict regarding powering down the hard disk drive by the BIOS driver thus precludes the use of IDE drivers that could provide significant improvement in the speed of laptop and desktop computers.

Accordingly, there exists a need in the art for a method and apparatus for controlling power down of a hard disk drive when the hard disk drive is subject to control by two drivers.

SUMMARY OF THE INVENTION

The present invention resolves the above-described problems in the art by providing an improved driver for controlling a hard disk drive. The improved driver will operate in conjunction with a second driver, which also can power down the hard disk drive, and the improved driver will arbitrate power down of the hard disk drive to avoid conflicts between the drivers.

The present invention operates in a computer having a hard disk drive and first and second drivers separately capable of powering down the hard disk drive. The improved method for controlling the hard disk drive includes the steps of monitoring activities of the first driver relating to the hard disk drive to detect a pattern that indicates that the first driver is going to power down the hard disk drive. Next, the first driver is inhibited from powering down the hard disk drive. Any activities of the second driver relating to the hard disk drive are then completed. The second driver is then inhibited from utilizing the hard disk drive, thus allowing the first driver to power down the hard disk drive.

After the first driver powers down the hard disk drive, the hard disk drive is reactivated under control of the second driver when needed.

Thus, in a computer having a hard disk drive and first and second drivers capable of powering down the hard disk drive via a hard disk drive controller, the improved second driver includes a monitor for monitoring an alternate status register in the hard disk drive controller to detect at least one access to the alternate status register by the first driver. After detecting an access to the register by the first driver, the second driver immediately begins to perform and complete its activities relating to the hard disk drive. Specifically, before the first driver powers down the hard disk drive, the second driver accesses a file system manager for the hard disk drive to detect any buffers controlled by the file system manager that contain uncommitted data that is to be written to the hard disk drive. The second driver then writes any uncommitted data in the buffers to the hard disk drive. Thus, the second driver completes any pending activities relating to the hard disk drive.

Before the first driver is permitted to power down the hard disk driver, a timer is set. The timer is set to time-out after the first driver powers down the hard disk drive. After setting the time, the second driver inhibits itself from accessing the hard drive, and releases access to the hard disk drive to the first driver, which will power down the hard disk drive. After the first driver powers down the hard disk drive, the timer times out. The second driver reactivates and accesses the hard disk drive after the timer times-out.

More specifically described, the first driver is typically a Basic Input/Output System (BIOS) driver familiar to those skilled in the art. The BIOS driver can power down the hard disk drive in the computer. The BIOS driver was created to operate in conjunction with disk operating systems marketed under the trademark "MS-DOS" by Microsoft Corporation, the assignee of the present invention, and is generally part of a larger software module commonly referred to as the BIOS.

The second, and improved, driver is referred herein to as an Integrated Device Electronics (IDE) driver. The IDE driver is a software module developed more recently than the BIOS driver. The IDE driver operates in conjunction with, or as part of, the operating systems sold under the "WINDOWS" trademark and operating systems compatible therewith. Operating systems sold under the "WINDOWS" trademark, and operating systems compatible therewith, form the environment for the present invention. As is familiar to those skilled in the art, the BIOS driver, BIOS software, IDE driver, and operating system sold under the "WINDOWS" trademark are frequently packaged together in a single computer.

The BIOS driver and the IDE driver both have access to the hard disk drive. Both the BIOS and the IDE driver can separately power down the hard disk drive.

The improved IDE driver includes a monitoring service for monitoring a register in the hard disk drive controller to detect at least one access to the register by the BIOS driver.

Typically, the monitored register is the "alternate status register." Access to the alternate status register by the BIOS driver indicates that the BIOS driver is about to power down the hard disk drive.

After detecting an attempted read of the alternate status register by the BIOS driver, the IDE driver performs certain operations to preserve data before allowing the BIOS driver to read the hard disk drive. The improved IDE driver accesses a file system manager for the hard disk drive, thereby enabling the file system manager to detect any buffers that contain uncommitted data which is to be written to the hard disk drive. The IDE driver writes any uncommitted data in the buffers to the hard disk drive. A timer is then set to time-out after the BIOS driver powers down the hard disk drive. The IDE driver then allows the BIOS driver to read the alternate status register, thereby releasing access to the hard disk drive to the BIOS driver, which will power down the hard disk drive.

After the hard disk drive is powered down, the timer times-out. The time-out will reactivate the IDE driver. The IDE driver will reactivate and access the hard disk drive as necessary.

Thus, it is an object of the present invention to provide an improved power management scheme in a computer.

It is the further object of the present invention to provide a method of arbitrating between a first driver and a second driver wherein both drivers can independently power down a hard disk drive.

More specifically, it is an object of the present invention to provide an improved second driver for a hard disk drive that will recognize and respond appropriately to the first driver attempting to power down the hard disk drive.

Furthermore, it is an object of the present invention to provide a second driver for a hard disk drive that will recognize an attempt by a first driver to power down the hard disk drive, will complete its operations before the first driver powers down the hard disk drive, and reactivates itself after the first driver powers down the hard disk drive.

That the present invention accomplishes these objects and overcomes the above-cited drawbacks of the prior art will be apparent to those skilled in the art from the drawings and the detailed description to follow.

DETAILED DESCRIPTION

Figure 1:
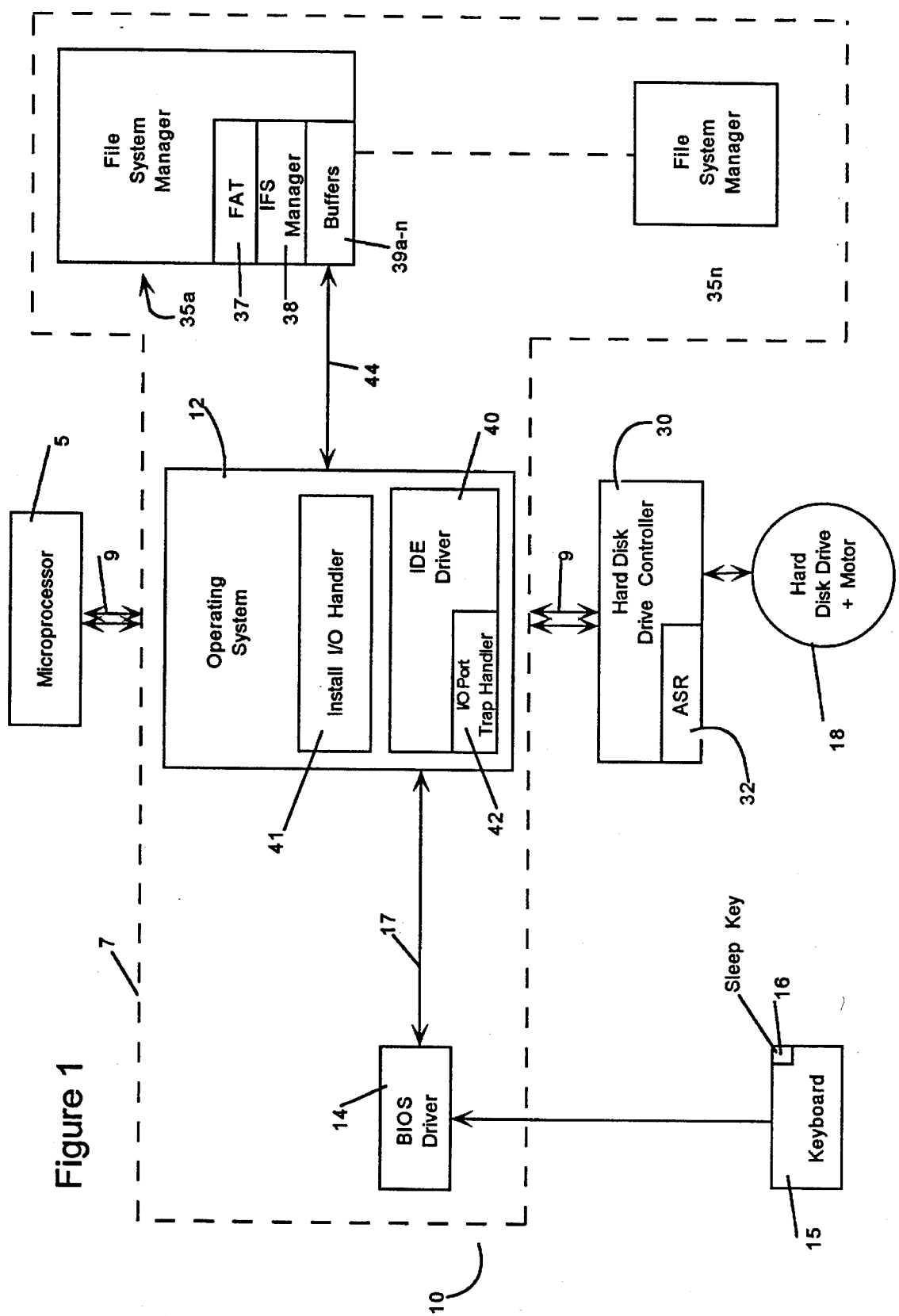
FIG. 1 is a block diagram of a computer system showing the preferred environment for controlling power down of a hard disk drive in a computer having two hard disk drive drivers.

Turning next to the figures in which like numerals indicate like parts, FIG. 1 is a block diagram of a computer 10 showing the preferred environment for controlling power down of a hard disk drive 18. Before detailing the interaction between the Basic Input/Output System (BIOS) driver 14 and the Integrated Drive Electronic (IDE) driver 40 in arbitrating an attempt to power down the hard disk drive 18, the environment of the preferred embodiment is set forth. Referring to FIG. 1, the preferred operating system (OS) 12 is software typically run by a microprocessor 5 within the computer 10. The OS 12 is stored in memory 7 and is accessed via the control and data busses 9. The memory 7 may be random access memory, read only memory, or other memory familiar to those skilled in the art, and the software in memory 7 may be split among many memory units, devices or types. The microprocessor 5, memory 7 and control and data busses 9 used in computers are familiar to those skilled in the art.

The OS 12 controls the creation and deletion of files in memory, allocation of memory to application programs, and other functions that are performed by the microprocessor 5 during basic operations of the computer 10. The most common OS for personal computers in the world is sold under the trademark "WINDOWS" by Microsoft Corporation, which is headquartered in Redmond, Wash. and is the assignee of the present invention. The OS 12 in the preferred embodiment is compatible with operating systems sold under the "WINDOWS" trademark, and is familiar to those skilled in the art. The term "operating system" throughout this specification refers only to operating systems marketed under the "WINDOWS" trademark or operating systems compatible therewith.

The IDE driver 40 is preferably a subcomponent of the OS 12, although it could be a module of software that is separate from the OS 12. The IDE driver 40 controls the movement of data between the OS 12 and higher level software (i.e., application programs) and the hard disk drive 18 via the hard disk drive controller 30.

In a somewhat narrow sense, the BIOS driver 14 is a device control program. The BIOS driver 14 translates simple commands, such as a command to read something from the hard disk drive 18, into the executable steps needed to actually perform the command. As discussed above, the BIOS driver 14 serves to keep track of some of the input and output processes between a user of computer 10 and the hard disk drive 18. The BIOS driver 14 is preferably part of a larger BIOS software module (not shown) familiar to those skilled in the art. The BIOS driver 14 is stored in memory 7. The file system managers 35$a$–$n$ are described below. The file system managers 35$a$–$n$ are also stored in memory 7, and are familiar to those skilled in the art.

The IDE driver 40 preferably operates as part of the OS 12 in "protected mode." The BIOS driver 14 operates in virtual mode, which means that the BIOS driver 14 acts as if it is the only program running on the computer 10, but the OS 12 is operating in conjunction with the BIOS driver 14 in a manner familiar to those skilled in the art.

The hard disk drive 18 within the computer 10 is controlled by two distinct drivers. First, the BIOS driver 14 issues commands to the hard disk drive 18 and can power down the hard disk drive 18. The BIOS driver 14 reads data from and writes data to the hard disk drive 18. Second, the IDE driver 40 also has access to power down the hard disk drive 18. The IDE driver 40 also reads data from and writes data to the hard disk drive 18. The preferred IDE driver 40 of the present invention ensures that power downs by the BIOS driver 14 do not interfere with operations performed by the IDE driver 40.

For purposes of the present invention, two specific functions or operations performed by the BIOS driver 14 in conjunction with the hard disk drive 18 are addressed. First, as is familiar to those skilled in the art, the BIOS driver 14 monitors a keyboard 15 including a sleep key 16. The sleep key 16 is primarily intended for use on portable computers. Depressing the sleep key 16 suspends certain operations within computer 10 to conserve power. Depressing the sleep key 16 is detected by BIOS driver 14 to power down the hard disk drive 18.

Alternatively, there is a routine within BIOS driver 14 that will automatically power down hard disk drive 18 after a predetermined time period during which the hard disk drive 18 has not been accessed via the BIOS driver 14. For example, a user might set the BIOS driver 14 so that the hard disk drive 18 is powered down after three minutes during which the hard disk drive 18 is not accessed by the BIOS driver 14. Those skilled in the art are familiar with both of the above-described methods for powering down the hard disk drive 18.

There are two methods for powering down the hard disk drive 18. First, the hard disk drive 18 may be "spun down." Spinning down the hard disk drive 18 means turning off the motor, (shown as part of the hard disk drive 18 in FIG. 1) which continually spins the platter (not shown) containing electronically encoded information. A "spun down" hard disk drive is deemed to be in a "standby" mode. As is familiar to those skilled in the art, turning off the motor in the hard disk drive 18 results in significant power savings. Alternatively, the hard disk drive 18 may be put to "sleep." Putting the hard disk drive 18 to sleep includes spinning down the motor in the hard disk drive 18, as well as turning off the hard disk drive controller 30. As discussed below, the hard disk drive controller 30 is hardware that interacts with and controls the hard disk drive 18. The hard disk drive 18 is familiar to those skilled in the art.

The hard disk drive controller 30 includes a plurality of registers or ports that may be read or written to for controlling the hard disk drive 18. The hard disk drive controller 30 accepts data, addresses and commands for controlling access to the hard disk drive 18. These registers accept commands from the BIOS driver 14 and IDE driver 40 for controlling the hard disk drive 18. The registers translate the received commands into the actions dictated by the commands in a manner familiar to those skilled in the art. For example, read and write commands control access to the hard disk drive 18. Those skilled in the art are familiar with hard disk drive controllers, such as hard disk drive controller 30, that function according to the AT Attachment (ATA) standard.

Working in conjunction with the hard disk drive controller 30 is one of the file system managers 35*a–n*. Each file system manager 35*a–n* includes information to keep track of the status of the hard disk drive 18. The file system manager 35*a* is associated with the hard disk drive 18, although other file system managers 35*b–n* may also be associated with portions of the hard disk drive 18.

Preferably, each file system manager 35*a–n* includes a File Allocation Table (FAT) 37, although other software for controlling and tracking the data written to the hard disk drive 18 may be used. As will be familiar to those skilled in the art, the FAT 37 is a system for tracking what information is stored on the hard disk drive 18, and which portions of hard disk drive 18 are available for storing data. Thus, the allocation of memory within the hard disk drive 18 is managed by the FAT 37. Frequently, the FAT 37 is simply a table of numbers, with one number in the table corresponding to each cluster of information on the hard disk drive 18. The number in the FAT 37 corresponding to a cluster indicates if the cluster is in use by a file or is available for new data. The file system managers 35*a–n* form part of a "disk operating system" known to those skilled in the art. The IDE driver 40 works in conjunction with the file system manager 35*a* to pass data to and from the hard disk drive 18 in a manner set forth below. Other software routines for controlling the hard disk drive 18 are also found in each file system manager 35*a–n*, including the IFS_Manager 38, discussed below.

The preferred IDE driver 40 uses the file system manager 35*a* to interface with the hard disk drive controller 30 and the hard disk drive 18. Specifically, for example, the IDE driver 40 sends a write command to the hard disk drive controller 30 via control and data bus 9, and the file system manager 35*a* is used to determine what locations(s) the data can be loaded into on the hard disk drive 18. The line 44 indicates the passage of information between the OS 12 and file system manager 35*a*. Thus, the IDE driver 40 relies on the file system manager 35*a* to access the hard disk drive 18.

The BIOS driver 14 also reads from and writes to the hard disk drive 18 using information from the file system managers 35*a–n*. The hard disk drive controller 30 is therefore commanded by both the BIOS driver 14 and the IDE driver 40. There is a potential for direct conflict when allowing control over the hard disk drive 18 by two separate drivers. This potential for conflict is further heightened by the fact that the BIOS driver 14 is unaware of the IDE driver 40 operating in protected mode.

Figure 2A:
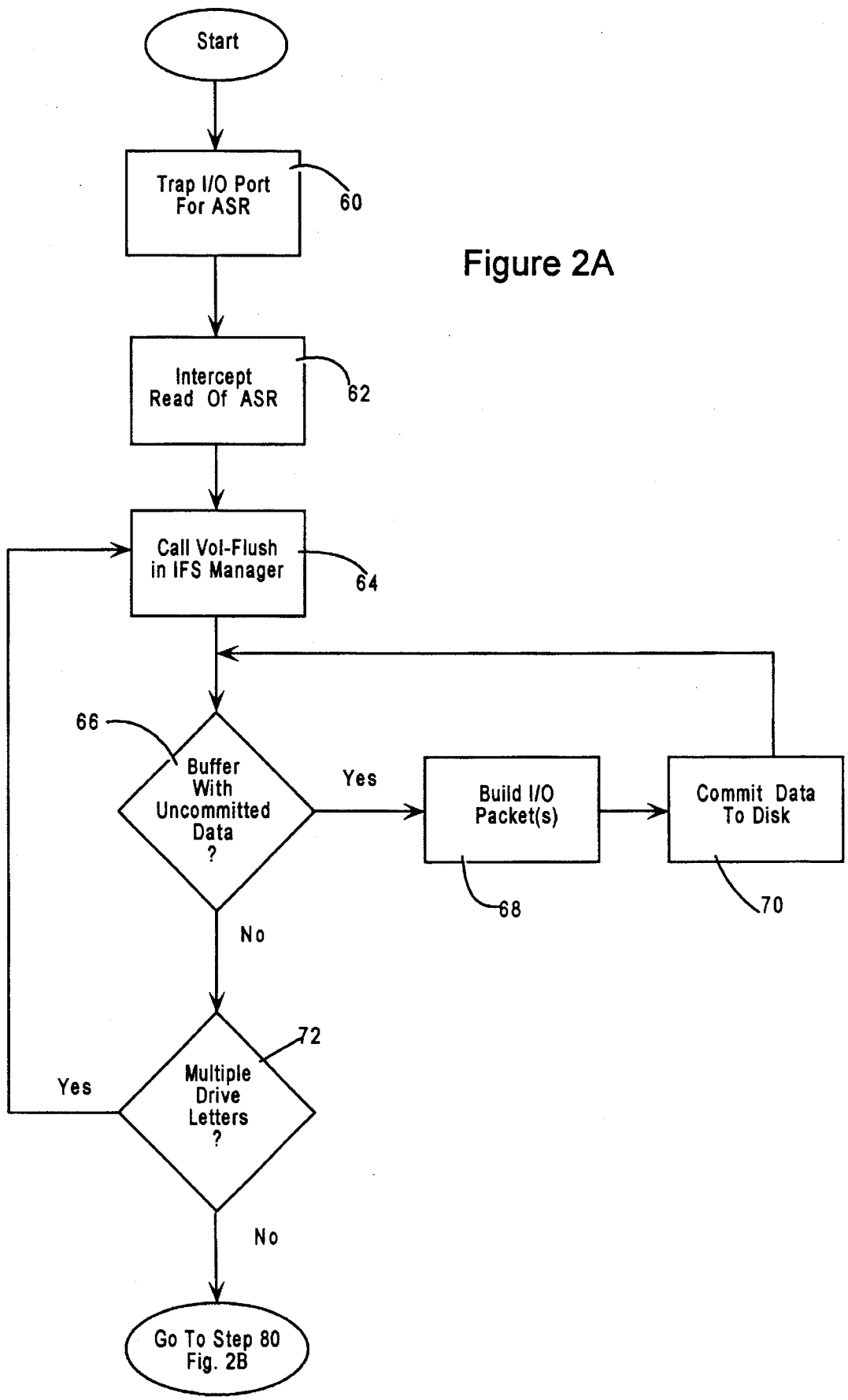
FIGS. 2A and 2B are flowcharts of the preferred method of detecting and responding to attempts to power down the hard disk drive in the computer system of FIG. 1.

In the preferred embodiment of the present invention, the IDE driver 40 intercepts and handles any attempts to power down the hard disk drive 18 by the BIOS driver 14 that conflict with operations of the IDE driver 40. FIGS. 2A and B are flowcharts illustrating the steps for the preferred method for powering down a hard disk drive having two separate drivers.

Figure 2B:
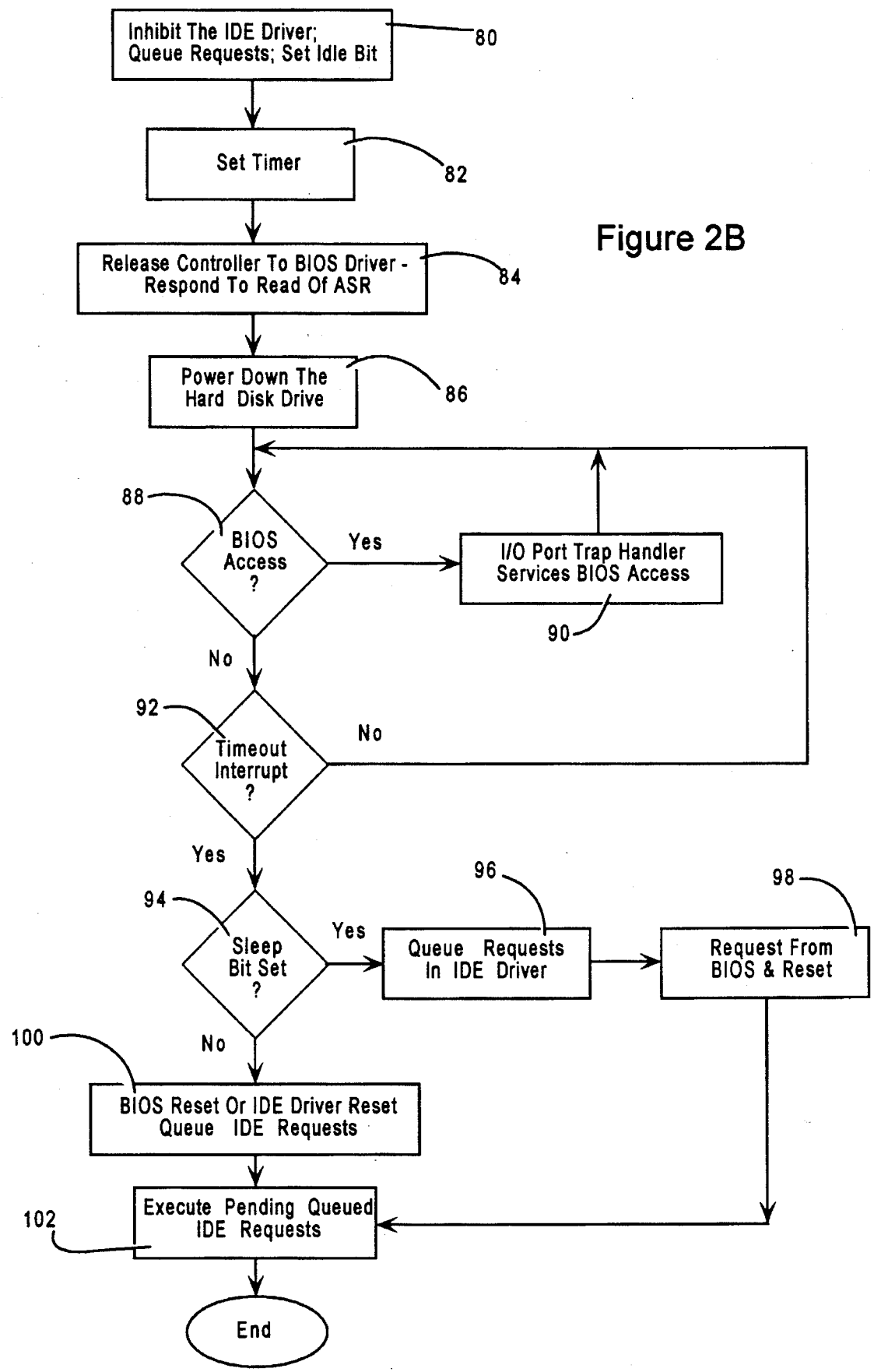

Referring to FIGS. 1 and 2A–2B, the first step taken by IDE driver 40 is step 60. At step 60, the hard disk drive controller 30, also described as the IDE controller, "traps" a register called the alternate status register (ASR) 32. The ASR 32 is located in the hard disk drive controller 30. The ASR 32 contains information regarding the status of the hard disk drive 18, and the ASR 32 can be read to obtain information regarding the hard disk drive 18 without resetting any interrupts. The ASR is familiar to those skilled in the art.

In the preferred embodiment of the present invention, it was recognized that the BIOS driver 14 reads the ASR 32 if and only if the BIOS driver 14 is about to power down the hard disk drive 18. Therefore, at step 62, any read of the ASR 32 indicates that the hard disk drive 18 is about to be powered down by BIOS driver 14. Those skilled in the art will recognize that other patterns of activities by the BIOS driver 14 could be monitored to determine or detect an activity or pattern of activities that indicate that the hard disk drive 18 will be powered down.

The BIOS driver 14, which also can be implemented as a "real mode" driver which contains a superset of BIOS functions, is trapped at step 60 by calling the service "Install_I/O_Handler" 41. The Install I/O Handler 41 is a software service for registering a call back pointer for a specific I/O port, such as the ASR 32, when that port is addressed by BIOS. The OS 12 provides the software service Install_I/O_Handler 41 that monitors the activities of BIOS driver 14 with respect to identified register(s), as is familiar to those skilled in the art. A call from the BIOS driver 14 to the ASR 32 is recognized by the Install_I/O_Handler 41. The Install_I/O_Handler 41 detects and intercepts such calls by recognizing calls to the address of the ASR 32. It supports the trapping of a specific Input/Output port. Thus, the line 17 indicates the interception of information and calls from the BIOS driver 14 by the Install_I/O_Handler 41. When the ASR 32 is trapped, the IDE driver 40 assumes responsibility for executing the call to the ASR 32, as is familiar to those skilled in the art. Thus, after recognizing a call to the ASR 32, the OS 12 can take any action required before completing the call from the BIOS driver 14.

Any reads of the ASR 32 are detected by the Install_I/O_Handler 41 at step 62, and lead to a call to a program called the I/O Port Trap Handler 42 at step 64. The I/O Port Trap Handler 42 is a software module in the IDE driver 40 that prepares the IDE driver 40 for the power down of the hard disk drive 18.

By assuming responsibility for executing any reads or writes to the ASR 32, the preferred OS 12 intercepts the call to the ASR 32 and does not respond to it immediately. Instead, at step 64, the I/O Port Trap Handler routine 42 in the IDE driver 40 is executed. Thus, during steps 64–82, the BIOS driver 14 is temporarily inhibited from powering down the hard disk drive 18 via the delay in acting upon the request to read the ASR 32 while the I/O Port Trap Handler routine 42 is executed.

At step 64, the IDE driver 40 begins to complete any pending operations, and queue future operations, with the hard disk drive controller 30 before allowing the BIOS driver 14 to shut down the hard disk drive 18. Specifically, as was stated above, the IDE driver 40 supports "lazy writing" wherein data that needs to be written to the hard disk drive 18 is temporarily stored in one or more buffers 39a–n in the file system manager 35a. At step 64 in the preferred embodiment, any uncommitted data in the buffers 39a–n in the file system manager 35a is written or committed to the hard disk drive 18. To perform this task, the IDE driver 40 calls a software module in the file system manager 35a called the IFS_Manager 38. The specific service within the IFS_Manager 38 called by the IDE driver 40 is "Vol_Flush". The call is made with one parameter that indicates the drive letter (i.e., "a:", "b:", "c:", etc.) of the hard disk drive 18 being powered down. The call for the service Vol_Flush with the drive letter parameter causes any uncommitted data intended for the specified hard disk drive 18 stored in buffers 39a–n to be written. Those skilled in the art are familiar with writing data from a buffer to a hard disk drive.

The file system manager 35a is accessed because it is associated with the hard disk drive 18 that is being powered down. The drive letter passed with the Vol_Flush call is used to associate the specific file system manager 35a, from among all the file system managers 35a–n, with the hard disk drive 18 that is being powered down.

As is familiar to those skilled in the art, the buffers 39a–n include buffer headers with bits that indicate the buffer has data that is yet to be committed to the hard disk drive 18. At step 66, a header in each buffer 39a–n is used to determine if any data within the buffers 39a–n in the file system manager 35a is to be committed to the hard disk drive 18. The buffers 39a–n in the file system manager 35a are typically 4,098 bytes in length, however, buffers of a different size may be utilized. Those skilled in the art are familiar with file storage formats/systems other than the preferred buffers 39a–n that could be used in conjunction with the present invention.

If there is uncommitted data within the buffers 39a–n in the file system manager 35a, the "Yes" branch is followed from step 66 to step 68. At step 68, packets of uncommitted data are assembled for writing to the hard disk drive 18 in a manner familiar to those skilled in the art and described in the ATA standard. At step 70, the uncommitted data in the buffers within the file system manager 35a is written to the hard disk drive 18.

After writing the previously uncommitted data to the hard disk drive 18, or if there is not uncommitted data in the buffers 39a–n at step 66, step 72 is executed. At step 72, the IDE driver 40 insures that the hard disk drive 18 has not been divided between two drive letters. For example, users sometimes divide files and information stored in the single hard disk drive 18 among two drive letters, for example "c:" and "d:". If the hard disk drive 18 is listed under two different drive letters, two different file system managers 35a–n control the hard disk drive 18. If the hard disk drive 18 has been assigned multiple drive letters, as recorded by the OS 12, the "Yes" branch will be followed from step 72 to step 64. At step 64 the uncommitted data in the identified file system manager 35a–n associated with the second drive letter will be committed to the hard disk drive 18. Thus, all uncommitted data intended for the hard disk drive 18 will be written to the hard disk drive 18.

After all data intended for the hard disk drive 18 has been committed to the hard disk drive 18, the "No" branch is followed from step 72 to step 80 in FIG. 2B. At step 80, the "Idle Bit" (not shown) of the IDE driver 40 is set to indicate that all uncommitted data has been written to the hard disk drive 18. The setting of the flag "Idle Bit" indicates that an orderly shut down of the IDE driver 40 has been completed, including the writing of all uncommitted data to the hard disk drive 18. Specifically, the "Idle Bit" is set after the BIOS driver 14 commands the hard disk drive controller 30 to spin down or to put to "sleep" the hard disk drive 18, or upon the flushing of the cache.

Referring still to FIGS. 1 and 2A–2B, at step 80, the IDE driver 40 is inhibited. Because the IDE driver 40 is inhibited, any requests for access to the hard disk drive 18 occurring after the IDE driver 40 is inhibited are queued. The IDE driver 40 accepts calls for access to the hard disk drive 18 and queues the calls for later execution in a manner familiar to those skilled in the art. The IDE driver 40, being a software module, is put into a loop to accept and queue calls for access until the hard disk drive 18 is accessible. By delaying the occurrence of a response to a request for access to the hard disk drive 18, the IDE driver 40 will not attempt to access the hard disk drive 18 that is being powered down or is powered down by BIOS driver 14. Any requests for access to the hard disk drive 18 are simply stored by the IDE driver 40 in memory 7.

At step 82, a timer is set. In the preferred embodiment, the timer is provided by the OS 12. For example, in OS 12 a software timer is accessed by issuing a call for service of "Set_Asynch_Timer", as is familiar to those skilled in the art. In the preferred embodiment, the timer is set to expire three seconds after it is initialized at step 82.

At step 84, the I/O Port Trap Handler 42 for the IDE driver 40 finally responds to the BIOS driver 14 request to read the ASR 32. Functionally, allowing the BIOS driver 14 to read the ASR 32 releases control over the hard disk drive 18 to the BIOS driver 14.

The I/O Port Trap Handler 42 at step 84 reads and provides the contents of the ASR 32 to the BIOS driver 14. After the ASR 32 is read, the hard disk drive 18 is powered down by the BIOS driver 14 at step 86. Powering down of the hard disk drive 18 by BIOS driver 14 is an operation that is familiar to those skilled in the art.

At step 88, the hard disk drive 18 is powered down and the IDE driver 40 remains deactivated, yet the BIOS driver 14 may still access the hard disk driver controller 30. The BIOS driver 14 is free to access the hard disk drive 18 at step 88. Following the "Yes" branch, each access by the BIOS driver 14 is serviced by the I/O Port Trap Handler 42 at step 90. Because the idle bit is set (at step 80), the IDE driver 40 was safely powered down and the BIOS driver 14 is allowed to access the hard disk drive controller 30. Therefore, the I/O Port Trap Handler 42 executes any calls from the BIOS driver 14 to the hard disk drive controller 30 at step 90.

For each access of the hard disk drive controller 30, the BIOS driver 14 outputs a command that instructs the hard disk driver controller 30 to either "spin" down (standby mode) or to go to "sleep" (sleep mode). In step 90, the IDE driver 14 responds to each access by controlling the state of a selected bit within the IDE driver 40, specifically the sleep bit. This sleep bit is set if the hard disk drive 18 has entered the "sleep" mode. For example, if the BIOS driver 14 commands the hard disk drive controller 30 to put to "sleep" the hard disk drive 18, then the IDE driver 40 responds by setting the sleep bit. Alternatively, the IDE driver 40 does not set the sleep bit if the BIOS driver 14 commands the hard disk drive controller 30 to spin down the hard disk drive 18.

If no BIOS access occurs at step 88, the "No" branch is followed to step 92 and the status of the timer is analyzed. If the timer has not timed-out and generated an interrupt, the "No" branch is followed back to step 88.

Ultimately, the timer set at step 82 will generate an interrupt at step 92. In other words, the response to the service "Set_Asynch_Timer" will interrupt the IDE driver 40 and indicate that power down of the hard disk drive 18 by the BIOS driver 14 should be completed.

After the timer expires at step 92, the "Yes" branch is followed to step 94. The state of the sleep bit in the IDE driver 40 is analyzed at step 94. If the sleep bit has been set at step 90, then the hard disk drive 18 has been put to sleep and the "Yes" branch is followed from step 94 to step 96. On the other hand, if the sleep bit has not been set, the hard disk drive 18 has been spun down and the "No" branch is followed from step 94 to step 100. As previously described, the IDE driver 40 controls the state of the sleep bit based on the commands supplied by the BIOS driver 14 for the hard disk drive controller 30.

If the hard disk drive 18 is put to sleep, the "Yes" branch is followed from step 94 to step 96. In the preferred embodiment, resetting the hard disk drive 18 is a BIOS driver 14 function that the IDE driver 40 does not control. Thus, requests for access to the hard disk drive 18 received by the IDE driver 40 are queued in the IDE driver 40 at step 96 until the BIOS driver 14 resets the hard disk drive 18. However, because the IDE driver 40 is still trapping the registers written to by BIOS driver 14, the reset command from the BIOS driver 14 is detected at step 98. Only after the reset command is detected at step 98 are the pending IDE driver 40 requests for access to the hard disk drive 18 executed. After the BIOS driver 14 resets the hard disk drive 18 at step 98, the pending IDE driver 40 requests are executed at step 102 in a manner set forth below.

On the other hand, the hard disk drive 18 may have only been spun down. In this case, the "No" branch is followed from step 94 to step 100. At step 100, the IDE driver 40 waits to receive any requests for access to the hard disk drive 18 or a reset from the BIOS driver 14.

If an IDE driver request for access to the hard disk drive 18 is queued or received, or the BIOS driver 14 attempts to reset or access the hard disk drive 18, the request(s) are handled at step 102. Specifically, at step 102 the requests for access to the hard disk drive 18 via the IDE driver 40 are executed at step 102.

The request for access to the hard disk drive 18 via the IDE driver 40 that are queued at step 96 or 100 are performed at step 102. As will be familiar to those skilled in the art, these requests entail accepting the requests from the OS 12 and reading data from or writing data to the hard disk drive 18. Thus, data is written through the BIOS driver 14 or the IDE driver 40 to the hard disk drive 18, in a manner familiar to those skilled in the art, to satisfy the outstanding requests.

It will be apparent that when the hard disk drive 18 is spun down, the IDE driver 40 does not wait for a reset command from the BIOS driver 14. In this case, the IDE driver 40 is reactivated and accesses the hard disk drive 18 without requiring further interaction with the BIOS driver 14 at step 100. The IDE driver 40 reactivates the hard disk drive 18 in response to a request for access to the hard disk drive 18, and in a manner well known to those skilled in the art and described in the ATA standard. Generally described, the IDE driver 40 writes a bit to a register (not shown) in the hard disk drive controller 30 that selects the hard disk drive 18. The IDE driver 40 then reads the "busy bit" in the ASR 32. When the busy bit is cleared, the IDE driver 40 will execute the request for access to the hard disk drive 18. The hard disk drive controller 30 then sets and clears the busy bit when the hard disk drive 18 can be accessed.

On the other hand, if the hard disk drive 18 has been put to sleep, the queued requests will not be executed until the BIOS driver 14 performs a hardware reset of the hard disk drive 18 at step 98. As will be familiar to those skilled in the art, the typical method for awakening the hard disk drive 18 from sleep is depressing a key on the keyboard 15. The BIOS driver 14 monitoring the keyboard will reset the hard disk drive 18 in response to the depressed key. Therefore, if the hard disk drive 18 is put to sleep, only the BIOS driver 14, and not the IDE driver 40, can reset the hard disk drive 18.

The buffers 39a–n in file system managers 35a–n are preferably flushed in about a tenth of a second per buffer 39a–n. Thus, the delay incurred in executing the power down command issued by the BIOS driver 14 is a fairly short time period. The gain obtained by using the IDE drivers 40 instead of the BIOS driver 14 for accessing the hard disk drive 18 is an approximate 50–65% increase in access times. This gain more than offsets the slow down in executing the power down command from the BIOS driver 14.

Those skilled in the art will recognize that the above components, including the microprocessor 5, memory 7 and hard disk drive 18 may be of many makes and types familiar to those skilled in the art, as long as the components are compatible with the OS 12. The OS 12 is the operating system marketed by Microsoft Corporation under the "WINDOWS" trademark, or an operating system compatible therewith.

In view of the foregoing description of the preferred embodiment in its intended environment, other embodiments of the present invention will suggest themselves to those skilled in the art. Therefore, the scope of the present invention is to be limited only by the claims below and equivalents thereof.

I claim:

1. In a computer having a hard disk drive and first and second drivers separately capable of powering down the hard disk drive, an improved method for controlling the hard disk drive comprising the steps of:

monitoring activities of the first driver relating to the hard disk drive to detect a pattern that indicates that the first driver is going to power down the hard disk drive;

inhibiting the first driver from powering down the hard disk drive in response to detection of the pattern;

completing activities of the second driver relating to said hard disk drive;

inhibiting the second driver from utilizing the hard disk drive;

allowing the first driver to power down the hard disk drive; and reactivating the hard disk drive after the first driver powers down the hard disk drive, the hard disk drive being reactivated under control of the second driver.

2. The method of claim 1 wherein the step for monitoring activities of the first driver relating to the hard disk drive comprises the second driver monitoring any access of a register by the first driver.

3. The method of claim 2 wherein the register is an alternate status register.

4. The method of claim 1 wherein the step for inhibiting the first driver from powering the hard disk drive includes trapping commands from the first driver that are intended for the hard disk drive.

5. The method of claim 4 wherein the step of powering down the hard disk drive further includes queuing any requests for access to the hard disk drive received by the second driver.

6. The method of claim 1 wherein the step of completing activities of the second driver relating to said hard disk drive comprises:

accessing a file system manager associated with the hard disk drive;

detecting a buffer controlled by said file system manager that contains uncommitted data; and writing said uncommitted data from said buffer to the hard disk drive under control of the second driver.

7. The method of claim 1 wherein the step of completing activities of the second driver relating to said hard disk drive further includes queuing any requests for access to the hard disk drive from the second driver after allowing the first driver to power down the hard disk drive.

8. The method of claim 7 wherein the step of completing activities of the second driver relating to said hard disk drive further includes performing any queued requests for access to the hard disk drive by the second driver.

9. The method of claim 1 wherein the step of reactivating the hard disk drive after the first driver powers down the hard disk drive, the hard disk drive being reactivated under control of the second driver, comprises:

setting a timer prior to the time that the hard disk drive is powered down, wherein the timer times out after power down of the hard disk drive;

detecting the time out of said timer; and reactivating the hard disk drive after said timer expires under control of the second driver.

10. In a computer having a hard disk drive and first and second drivers capable of powering down the hard disk drive, an improved method for controlling the hard disk drive comprising the steps of:

intercepting a request for access to a register of the hard disk drive by the first driver that indicates that the first driver is going to power down the hard disk drive;

inhibiting the first driver from powering down the hard disk drive while:

completing activities of the second driver relating to said hard disk drive; and setting a timer;

inhibiting the second driver from utilizing the hard disk drive;

queuing any requests for access to the hard disk drive from the second driver;

responding to the access request by the first driver, thereby allowing the first driver to power down the hard disk drive;

reactivating the hard disk drive after said timer expires under control of the second driver; and performing any queued requests for access to the hard disk drive by the second driver.

11. The method of claim 10 wherein the step of intercepting the access request by the first driver comprises trapping at least one bit of the register by the second driver.

12. The method of claim 11 wherein the register is an alternate status register.

13. The method of claim 10 wherein the step of allowing the first driver to power down the hard disk drive comprises controlling the status of a selected bit of the second driver to indicate that the hard disk drive is in one of a sleep mode or a standby mode.

14. The method of claim 10 wherein the step of completing activities of the second driver relating to said hard disk drive comprises:

accessing a file system manager for the hard disk drive;

detecting a buffer controlled by said file system manager that contains uncommitted data; and writing said uncommitted data from said buffer to the hard disk drive under control of the second driver.

15. In a computer having a hard disk drive and first and second drivers capable of powering down the hard disk drive, an improved method for controlling the hard disk drive comprising the steps of:

trapping at least one bit in a port to detect at least one access to said port by the first driver;

inhibiting access to a hard disk drive controller by the first driver in response to detecting said access to said port;

accessing a file system manager for the hard disk drive after inhibiting access to said hard disk drive controller by the first driver;

detecting any buffer controlled by said file system manager that contains uncommitted data that is to be written to the hard disk drive;

writing any said uncommitted data from said buffer to the hard disk drive under control of the second driver;

inhibiting the second driver from accessing said hard disk drive controller after writing any said uncommitted data;

releasing access to said hard disk drive controller to the first driver, after inhibiting the second driver from accessing said hard disk drive controller, whereby the first driver can power down the hard disk drive; and releasing access to the hard disk drive controller to the second driver after the first driver powers down the hard disk drive.

16. The method of claim 15 wherein said port is an alternate status register port in the hard disk drive controller.

17. The method of claim 15 wherein the first driver powers down the hard disk drive in response to the status of a selected bit of the second driver, which indicates to the first driver that the hard disk drive is in one of a sleep mode or a standby mode.

18. In a computer having a hard disk drive and first and second drivers capable of powering down the hard disk drive, an improved method for controlling the hard disk drive comprising the steps of:

trapping at least one bit in an alternate status register port to detect at least one access to said alternate status register port by the first driver;

inhibiting access to a hard disk drive controller by the first driver;

accessing a file system manager for the hard disk drive;

detecting any buffers controlled by said file system manager that contain uncommitted data that is to be written to the hard disk drive;

writing said uncommitted data in said buffers to the hard disk drive under control of the second driver;

inhibiting the second driver from accessing said hard disk drive controller;

releasing access to said hard disk drive controller to the first driver, which powers down the hard disk drive;

releasing access to said hard disk drive controller to the second driver;

detecting a request for access to the hard disk drive via the second driver; and reactivating the hard disk drive in response to said request for access to the hard disk drive.

19. In a computer having a hard disk drive and first and second drivers capable of powering down the hard disk drive via a hard disk drive controller, an improved method for controlling the hard disk drive, comprising the steps:

detecting a request by the first driver for access to an alternate status register port in the hard disk drive controller;

delaying a response to the request for access from the first driver;

accessing a file system manager for the hard disk drive to detect any buffers controlled by said file system manager that contain uncommitted data that is to be written to the hard disk drive;

writing said uncommitted data in said buffers to the hard disk drive;

inhibiting the second driver from accessing said hard disk drive controller;

responding to the request for access by the first driver by powering down the hard disk drive;

detecting a request by the second driver for access to the hard disk drive; and reactivating the hard disk drive in response to said request by the second driver for access to the hard disk drive.

20. In a computer having a hard disk drive and first and second drivers capable of powering down the hard disk drive via a hard disk drive controller, an improved second driver for controlling the hard disk drive, comprising:

a monitor, for detecting a request for access to an alternate status register port in the hard disk drive controller by the first driver;

means for withholding the request for access from the first driver;

means for accessing a file system manager for the hard disk drive to detect any buffers controlled by said file system manager that contain uncommitted data that is to be written to the hard disk drive;

means for writing said uncommitted data in said buffers to the hard disk drive under control of the second driver;

a timer, which is set to time-out after the first driver powers down the hard disk drive;

means for inhibiting the second driver from accessing said hard disk drive controller;

means for responding to the request for access by the first driver, which will power down the hard disk drive; and means for accessing the hard disk drive controller via the second driver after said timer times out.

21. The apparatus of claim 20 wherein the means for accessing the hard disk drive driver via the second driver after said timer times out further includes:

means for detecting a request for access received at the hard disk drive via the second driver; and reactivating the hard disk drive in response to said request for access to the hard disk drive.

22. The apparatus of claim 20 wherein the means for accessing a file system manager is a Volume Flush servicer.

23. The apparatus of claim 20 wherein the first driver is a Basic Input/Output System Driver and the second driver is an Integrated Device Electronics driver.

24. In a computer having a hard disk drive and BIOS and IDE drivers capable of powering down the hard disk drive, an improved method for controlling the hard disk drive, comprising the steps of:

redirecting a request for access to a port of a controller of the hard disk drive by the BIOS driver to the IDE driver;

withholding a response to the access request while:
  accessing a file system manager for the hard disk drive;
  detecting any buffers of the file system manager that contain uncommitted data;
  writing the uncommitted data to the hard disk drive under control of the IDE driver; and
  inhibiting the IDE driver from accessing the hard disk drive;

responding to the access request by the BIOS driver, thereby allowing the BIOS driver to power down the hard disk drive; and reactivating the hard disk drive in response to a request by the IDE driver.

25. In a computer system capable of operating in a protected mode and a real mode, the computer system having a hard disk drive and first and second drivers capable of individually powering down the hard disk drive, an improved method for controlling the hard disk drive, comprising the steps of:

detecting that the first driver is attempting to power down the hard disk drive while the computer system is operating in the protected mode;

inhibiting the first driver from powering down the hard disk drive in response to detecting the power down attempt;

completing activity of the hard disk drive;

inhibiting the second driver from performing activity of the hard disk drive;

allowing the first driver to power down the hard disk drive while the computer system remains in the protected mode; and resuming activity of the hard disk drive.

* * * * *

UNITED STATES PATENT AND TRADEMARK OFFICE
CERTIFICATE OF CORRECTION

PATENT NO. : 5,574,920

DATED : November 12, 1996

INVENTOR(S) : William G. Parry

It is certified that error appears in the above-identified patent and that said Letters Patent is hereby corrected as shown below:

In column 13, line 13, claim 4, please insert --down-- after "powering" and in front of "the hard disk"

Signed and Sealed this

Twenty-eighth Day of December, 1999

Attest:

Q. TODD DICKINSON

*Attesting Officer*     Acting Commissioner of Patents and Trademarks